(No Model.)
L. HAVAUX.
CUTTING ARTICLES OF GLASS AND APPARATUS THEREFOR.
No. 537,110. Patented Apr. 9, 1895.
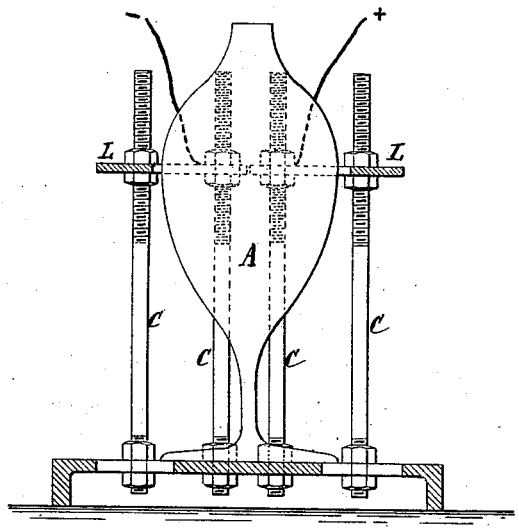
Fig. 1.
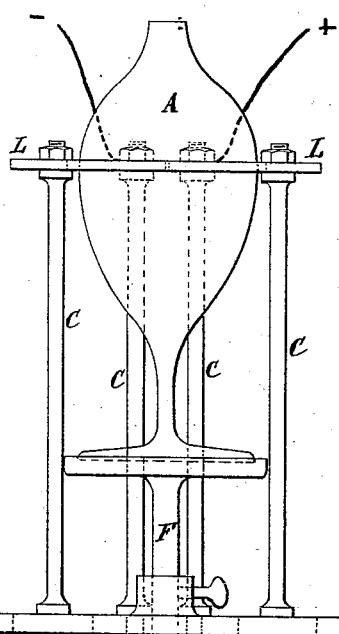
Fig. 3.
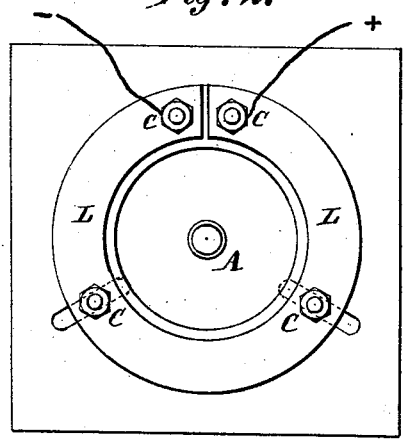
Fig. 2.
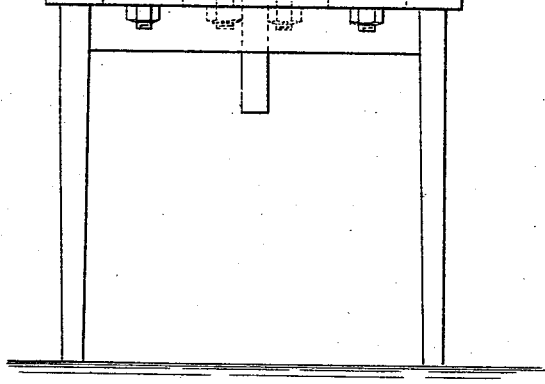
Witnesses:
Thomas Durant
Wallace Murdock
Inventor:
Léon Havaux
By Church & Church
his Attorneys.

UNITED STATES PATENT OFFICE.

LÉON HAVAUX, OF ST. GHISLAIN, BELGIUM.

CUTTING ARTICLES OF GLASS AND APPARATUS THEREFOR.

SPECIFICATION forming part of Letters Patent No. 537,110, dated April 9, 1895.

Application filed July 7, 1893. Serial No. 479,857. (No model.) Patented in Belgium July 15, 1892, No. 100,447, and March 22, 1893, No. 104,012; in France September 30, 1892, No. 224,656; in England October 4, 1892, No. 17,691, and March 28, 1893, No. 6,544; in Germany October 7, 1892, No. 68,740, and in Austria-Hungary February 10, 1893, No. 9,312/25,474 and No. 21,874/42,617.

*To all whom it may concern:*

Be it known that I, LÉON HAVAUX, a subject of the King of the Belgians, residing at St. Ghislain, Belgium, have invented certain new and useful Improvements in Cutting Articles of Glass and Apparatus Therefor, (for which I have obtained Letters Patent in England, No. 17,691, dated October 4, 1892, and No. 6,544, dated March 28, 1893; in France, No. 224,656, dated September 30, 1892, and Patent of Addition No. 224,656, dated March 24, 1893; in Belgium, No. 100,447, dated July 15, 1892, and Patent of Improvement No. 104,012, dated March 22, 1893, and Patent of Addition No. 73.527, dated March 27, 1893; in Austria-Hungary, No. 9,312/25,474, dated February 10, 1893, and No. 21,874/42,617, and in Germany, No. 68,740, dated October 7, 1892, and Patent of Addition No. 73,527, dated March 27, 1893,) of which the following is a specification.

This invention relates to improvements in glass cutting and has for its object to enable a regular and uniform severance to be secured transversely of round or curved articles such as table ware, although the use of the invention is not limited to such articles.

Referring to the accompanying drawings, Figure 1 is a sectional elevation showing a simple embodiment of the apparatus for carrying the invention into practice. Fig. 2 is a top plan view. Fig. 3 is a sectional elevation of an apparatus showing an adjustable support for the article to be cut.

Like letters of reference indicate the same parts in all the figures.

In carrying this invention into practice the glass article to be severed is surrounded or placed in juxtaposition to a high-resistance conductor of electricity, through which an electric current is sent and its temperature raised to a proper point to secure the breakage of the glass along the line of the high resistance conductor. For this purpose as shown in the accompanying drawings a plate or strip L of German silver having the shape of a flattened and almost complete ring cut through at one point is fixed on a sufficient number of well insulated uprights c. A strong electric current enters this ring at one side and leaves it at the other side (Figs. 1 and 2). The article A to be cut is placed in the interior of the ring and if an electric current strong enough to bring the ring to incandescence is passed through it the glass rapidly and uniformly divides at the part in the immediate neighborhood of the ring.

The article A may be placed on a movable table or support F (Fig. 3).

The uprights c may be screw-threaded so that the circular plate or strip L by means of nuts can be raised to different heights (Figs. 1 and 2). The uprights c (Figs. 2 and 3) are adjustable in slots in the base so that circular plates or strips L of different diameters may be employed.

Only two uprights may be used so that any size of plate can be used but in this case the plate must be supported between well-insulated rings, for instance between metal rings which are separated from the plate by mica or fire-proof rings.

I claim—

1. The herein described method of severing glass articles consisting in placing the article in proximity to, but not in contact with, a high resistance conductor of electricity and bringing said conductor to a heated condition by passing an electric current therethrough; substantially as described.

2. A cutter for glass articles consisting of the plate encircling said article in proximity thereto formed of a high resistance conductor divided at one point, insulated standard upon which said plate is mounted, and leading in and leading out wires connected directly to said encircling plate near its ends; substantially as described.

3. A cutter for glass articles consisting of the plate encircling the article, but not in contact therewith, a base, standards adjustably mounted on the base and adjustable connections between the standards and encircling plate, the vertically adjustable support for the article, and the leading in and leading out wires connected directly with the plate near its ends; substantially as described.

In testimony whereof I have hereto set my hand in the presence of the two subscribing witnesses.

LÉON HAVAUX.

Witnesses:
 GEORGE BEDE,
 GREGORY PHELAN.